(12) United States Patent
Chong, Jr.

(10) Patent No.: US 6,996,739 B2
(45) Date of Patent: Feb. 7, 2006

(54) ACCUMULATOR MEMORY FOR PERFORMING OPERATIONS ON BLOCK OPERANDS

(75) Inventor: Fay Chong, Jr., Cupertino, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 708 days.

(21) Appl. No.: 09/903,851

(22) Filed: Jul. 11, 2001

(65) Prior Publication Data

US 2003/0014685 A1 Jan. 16, 2003

(51) Int. Cl.
  *G06F 11/00* (2006.01)

(52) U.S. Cl. ............................ 714/5; 714/6; 714/49; 714/54

(58) Field of Classification Search .................. 714/5, 714/6, 53, 49, 54, 42, 801, 722, 805, 800, 714/16; 711/114
See application file for complete search history.

(56) References Cited

U.S. PATENT DOCUMENTS

| | | | |
|---|---|---|---|
| 4,888,679 A | | 12/1989 | Fossum et al. |
| 5,146,588 A | * | 9/1992 | Crater et al. ................. 714/6 |
| 5,392,425 A | * | 2/1995 | Elliott et al. ................ 714/16 |
| 5,412,671 A | * | 5/1995 | Tsuchiya .................... 714/805 |
| 5,590,307 A | | 12/1996 | McClure |
| 5,701,438 A | * | 12/1997 | Bains ......................... 711/211 |
| 5,896,406 A | | 4/1999 | Berry et al. |
| 6,052,822 A | * | 4/2000 | Kim et al. .................. 714/805 |
| 6,088,783 A | | 7/2000 | Morton |
| 6,122,708 A | | 9/2000 | Faraboschi et al. |
| 6,148,368 A | * | 11/2000 | DeKoning ................. 711/113 |
| 6,216,218 B1 | | 4/2001 | Sollars |
| 6,262,748 B1 | | 7/2001 | Deering et al. |
| 6,694,475 B1 | * | 2/2004 | Saito .......................... 714/763 |
| 2001/0013103 A1 | * | 8/2001 | Yamamoto et al. ............. 714/6 |
| 2002/0095642 A1 | * | 7/2002 | Karim et al. ............... 714/807 |
| 2004/0083420 A1 | * | 4/2004 | Oldfield et al. ............. 714/801 |

OTHER PUBLICATIONS

National Instruments. "dual–port memory".http://zone.ni.com/devzone/nidzgloss.nsf/10ce50b61f969f5a86256879000d3a01/7bd4ed210b9419268625686a00793f66?OpenDocument.*
Webster's Online Dictionary."random access memory". www. webster–dictionary.org/definition/random%20access%20memory.*
Jim Handy, "The Cache Memory Book: the authoritative reference on cache design," second edition, Academic Pres, 1993, pp. 57 and 64–65.
"Microsoft Computer Dictionary," Fifth edition, Microsoft Press, 2002, p. 391.

* cited by examiner

*Primary Examiner*—Robert Beausoliel
*Assistant Examiner*—Yolanda L Wilson
(74) *Attorney, Agent, or Firm*—Robert C. Kowert; Meyertons, Hood, Kivlin, Kowert & Goetzel, P.C.

(57) ABSTRACT

An apparatus for performing a block operation includes a functional unit, which performs an operation on one or more block operands, and an accumulator memory. The accumulator memory includes two independently interfaced memory banks. A control unit controls the memory banks in the accumulator memory so that each time the operation is performed, an operand is provided from one of the memory banks and a result is stored in the other memory bank. Since the memory banks are independently interfaced, the operand may be provided at the same time as the result is being stored. Additionally, since the result is stored in a different memory bank than the operand, the operation may be restarted if an error occurs.

31 Claims, 5 Drawing Sheets

ACCUMULATOR MEMORY FOR PERFORMING OPERATIONS ON BLOCK OPERANDS

BACKGROUND OF THE INVENTION

1. Field of the Invention

This invention relates to performing operations on block operands.

2. Description of the Related Art

Blocks of data are typically transmitted and/or processed as a single unit in a computer or network system. While block size is typically constant within any given system, different systems may have block sizes that range from a few bytes to several thousand bytes or more. There is a tendency for block size to increase with time, since advances in technology tend to allow larger units of data to be transmitted and processed as a single unit than was previously possible. Thus, an older system may operate on 32 byte blocks while a newer system may operate on 4 Kbyte blocks or larger.

In computer and network systems, many situations arise where it is useful to perform operations on blocks of data. For example, a RAID storage system that implements striping may calculate a parity block for each stripe. Each stripe may include several blocks of data, and the parity block for that stripe may be calculated by XORing all the blocks in that stripe. Another block operation may reconstruct a block that was stored on a failed device by XORing the parity block and the remaining blocks in the stripe. Similarly, in graphics processing, operations are often performed on multiple blocks of data. These block operations may be implemented in a system's main processor or controller. However, block operations like these are often implemented in dedicated hardware, leaving general processors and controllers free to tend to other operations and often improving the performance of the block operations.

Given the large amounts of data involved, block operations tend to consume large amounts of bandwidth. Returning to the parity example, if there are 5 blocks (B0–B4) of data in a particular stripe, the parity P for that stripe may equal B0 XOR B1 XOR B2 XOR B3 XOR B4. A RAID controller may be configured to calculate P using four instructions of the form A=A XOR Bn, where an accumulator A stores intermediate results:

(0) A=B0

(1) A=A XOR B1

(2) A=A XOR B2

(3) A=A XOR B3

(4) A=A XOR B4

(5) P=A

Note that in steps 1–4 of the example, the accumulator A stores both an operand and a result. Accordingly, performing each of these steps involves both a read from and a write to the accumulator. Furthermore, since the operands for each step are blocks of data, each step 1–4 may represent multiple sub-steps of byte or word XOR calculations (the size of the sub-step calculations may depend on the width of the functional unit performing the XOR calculation). For example, if each block is 4 Kbytes, step 1 may involve (a) receiving a word from the accumulator and a word of B1, (b) XORing the two words to get a result word, (c) overwriting the word received from the accumulator in step a with the result word, and (d) repeating a–c for the remaining words in block B1. As this example shows, performing a multi-block operation may involve alternating between a read and a write to the accumulator during each sub-step. Each of these reads and writes takes a certain amount of time to perform, and there may be an additional amount of time required to switch between read and write mode (e.g., time to precharge an output driver, etc.). Since each sub-step involves both a read and a write, the accumulator memory may not be able to keep up with the full bandwidth of the memory that is providing Bn unless the accumulator is capable of being accessed at least twice as fast as the memory storing Bn. If the accumulator cannot keep up with the memory that stores Bn, the accumulator will present a bottleneck.

An additional concern that may arise when using an accumulator is that as the bytes of the result are written, the result bytes overwrite the operand bytes already stored in the accumulator. Thus, the previous value of A is lost during each step. If an error occurs as one of the block operands Bn is being transmitted or during a step of the XOR calculation, an erroneous result may overwrite the previous value of the operand. When the error is detected, the entire operation may have to be redone, beginning at step 0.

Thus, accumulators used when performing block operations such as a parity calculation may create a performance bottleneck. For example, if the rate at which an accumulator memory can both provide an operand and store a new result is less than the rate at which the other operand (e.g., Bn) can be provided from its source, the accumulator memory will limit how quickly the operation can be performed. One possible way to alleviate such an accumulator bottleneck is to include specialized components in the accumulator memory. For example, if a memory that can be read from and written to at least twice as fast as the source of Bn is used for the accumulator memory, the accumulator memory may be able to keep up with the Bn source. However, such a memory may be too expensive to be practical. Additionally, such an accumulator memory may be inefficient. Generally, operations that are performed on large groups of data may be inefficient if they frequently switch between reading and writing data. For example, instead of allowing data to be transmitted in bursts, where the costs of any setup and hold time and/or time required to switch between read and write mode are amortized over the entire burst, frequently switching between reads and writes may result in data being transmitted in smaller, less efficient units. Accordingly, if the multi-block operation is being performed one word at a time, it may be necessary to repeatedly alternate between reading from and writing to the accumulator, reducing the accumulator's efficiency. As a result of this inefficiency, the memory may need to be more than twice as fast as the source of the other operand to avoid presenting a bottleneck.

Another solution to the accumulator bottleneck problem may be to use a specialized memory such as a dual-ported VRAM (Video Random Access Memory) for the accumulator in order to increase the bandwidth of the operation. Dual-ported VRAM can be read from and written to in the same access cycle. This may alleviate the accumulator bottleneck and allow the block operation to be performed at the speed that operand B can be fetched from its source.

While the dual-ported memory may alleviate the accumulator bottleneck, there are still several concerns that may arise when using a special-purpose memory. For example, special-purpose memories tend to be significantly more expensive than general-purpose memory devices. Additionally, special-purpose memories are more likely to be discontinued than general-purpose memories. There is also a greater possible that upgraded versions of special-purpose memories may not be available in the future. Both of these tendencies may limit the viability of special-purpose memories as a long-term design solution. Also, because they are special-purpose, these memories may be available from fewer vendors than general-purpose devices, making suitable memories difficult to locate and obtain.

SUMMARY

Various embodiments of systems and methods for performing operations on block operands are disclosed. In one embodiment, an apparatus may include a functional unit, which performs an operation on block operands, and an accumulator memory. The accumulator memory includes two independently interfaced memory banks. A control unit may control the memory banks in the accumulator memory. For example, the control unit may receive a first command. The first command may be a command to perform the functional unit's operation on a first operand, which is identified by the address of the accumulator memory, and to store the result of the operation to the same address. In response to receiving the command, the control unit may provide the operand from one of the memory banks and store the result to the other memory bank so that the result is stored in a different memory bank than the operand is stored in. This way, the operand may be provided via one interface at the same time that the result is being stored via another interface. After the first operation is completed, the control unit may be configured to provide the operand from the memory bank that the result was stored in if another command identifying the operand is received.

Both of the memory banks may include standard, mass-produced memory banks. In some embodiments, the functional unit may be configured to perform the operation on two operands, where one of the operands is received from the accumulator memory and another is received from another source. In one embodiment, the accumulator memory and the source of the other operand may include the same type and speed of memory.

As long as the result of the operation is stored in a memory bank other than the memory bank providing the operand, the result will not overwrite the original operand. As a result, if an error occurs while the operation is being performed, the operation may be restarted.

In another embodiment, an apparatus may include a functional unit configured to perform an operation on one or more block operands, an accumulator memory that includes a first and second memory bank, and a control unit. Both memory banks have interfaces that are independent of each other. The control unit may be configured to receive commands to perform the operation on an operand identified by a first address in the accumulator memory and to store the result of the operation to a second address in the accumulator memory. In response to receiving each command, the control unit may cause one of the memory banks to provide the operand to the functional unit and to map the second address to an address in the other memory bank so that the result is stored in the other memory bank. This way, the result is always stored in a different memory bank than the operand is stored in.

One embodiment of a method of performing a block operation includes receiving a first command to perform a first operation on an operand identified by a first address and to store the first result of the first operation to the first address, and in response to receiving the first command, providing the operand from a first memory bank in an accumulator memory via a first interface, performing the first operation on the operand, and storing the first result of the first operation in a second memory bank in the accumulator memory via a second interface. Since the first and second interfaces are independent of each other, the operand may be provided from the first memory bank at the same time that the result is being stored in the second memory bank.

Another embodiment of a method of performing a block operation includes receiving one or more commands to perform an operation on an operand identified by a first address in an accumulator memory and to store a result of the operation to a second address in the accumulator memory. In response to receiving each command, the first operand may be provided from one of the memory banks in the accumulator memory. The operation may be performed on the provided operand, and the second address may be mapped to a new address in the other memory bank in the accumulator memory so that the result of the operation is always stored in a different memory bank than the operand.

Figure 1:
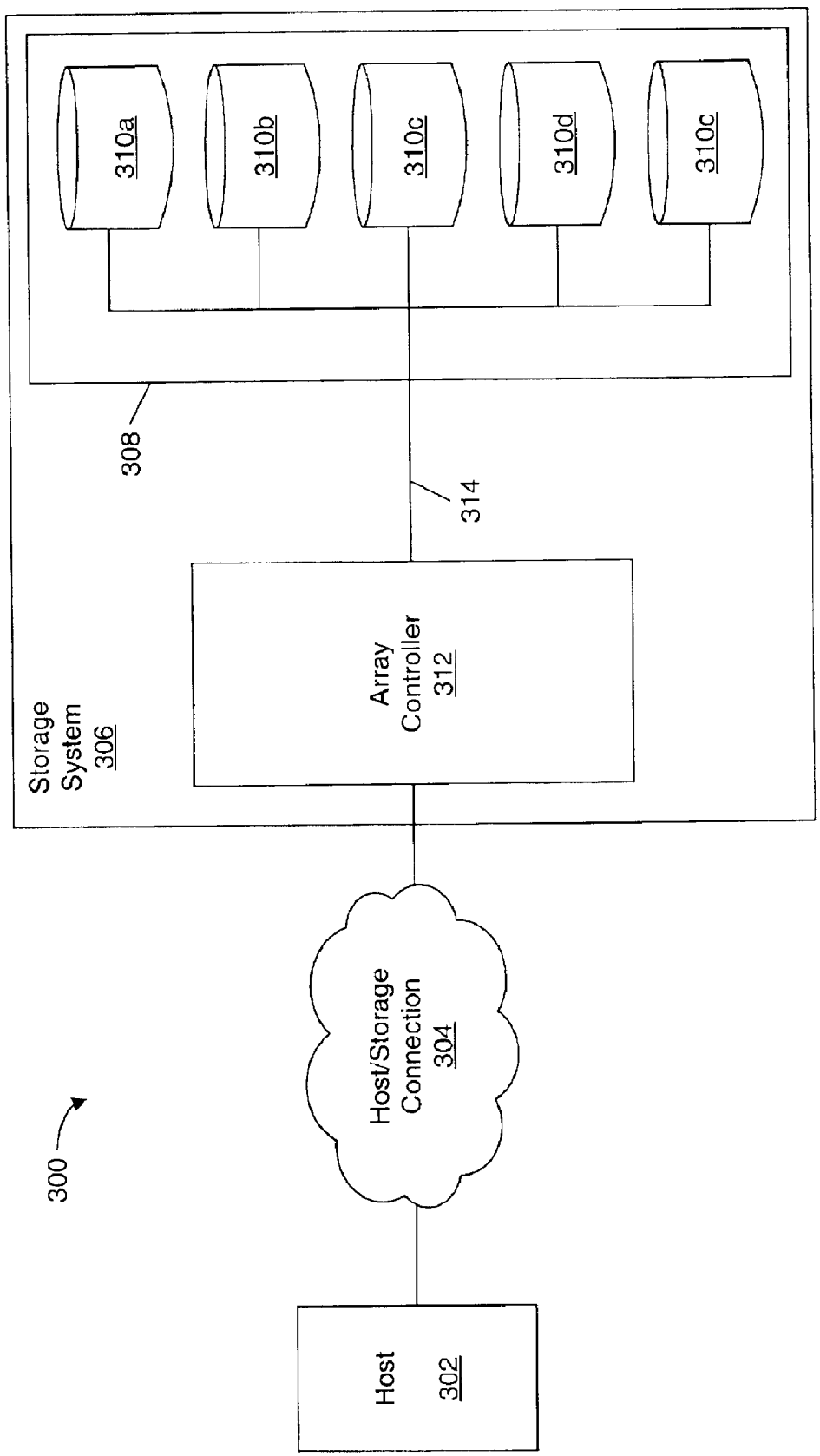
FIG. 1 shows one embodiment of a computer storage system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 shows one example of a system that may perform operations on block operands. In FIG. 1, a functional block diagram of a data processing system 300, which includes a host 302 connected to a storage system 306 via host/storage connection 304 is shown. Host/storage connection 304 may be, for example, a local bus, a network connection, an interconnect fabric, or a communication channel. Storage system 306 may be a RAID storage subsystem or other type of storage array. In various embodiments, a plurality of hosts 302 may be in communication with storage system 306 via host/storage connection 304.

Contained within storage system 306 is a storage device array 308 that includes a plurality of storage devices 310a–310e. Storage devices 310a–310e may be, for example, magnetic hard disk drives, optical drives, magneto-optical drives, tape drives, solid state storage, or other non-volatile memory. As shown in FIG. 1, storage devices 310 are disk drives and storage device array 308 is a disk drive array. Although FIG. 1 shows a storage device array 308 having five storage devices 310a–310e, it is understood that the number of storage devices 310 in storage device array 308 may vary and is not limiting.

Storage system 306 also includes an array controller 312 connected to each storage device 310 in storage array 308 via data path 314. Data path 314 may provide communication between array controller 312 and storage devices 310 using various communication protocols, such as, for example, SCSI (Small Computer System Interface), FC (Fibre Channel), FC-AL (Fibre Channel Arbitrated Loop), or IDE/ATA (Integrated Drive Electronics/Advanced Technology Attachment), etc.

Array controller 312 may take many forms, depending on the design of storage system 306. In some systems, array controller 312 may only provide simple I/O connectivity between host 302 and storage devices 310 and the array management may be performed by host 302. In other storage systems 306, such as controller-based RAID systems, array controller 312 may also include a volume manger to provide volume management, data redundancy, and file management services. In other embodiments of the present invention, the volume manager may reside elsewhere in data processing system 300. For example, in software RAID systems, the volume manager may reside on host 302 and be implemented in software. In other embodiments, the volume manager may be implemented in firmware that resides in a dedicated controller card on host 302. In some embodiments, array controller 312 may be connected to one or more of the storage devices 310. In yet other embodiments, a plurality of array controllers 312 may be provided in storage system 306 to provide for redundancy and/or performance improvements.

Computer systems such as storage system 306 may perform various block operations. For example, multiple operations may be performed on a series of block operands using an accumulator memory to store intermediate results. Similarly, in graphics systems, multiple operations may be performed on one or more blocks of display information, using a texture or frame buffer as an accumulator memory to store intermediate results.

One block operation that storage system 306 may perform is a block parity calculation. The storage system 306 shown in FIG. 1 may store data in stripes across the storage devices 310 and calculate a parity block for each stripe. The parity block may be calculated from each block in a stripe. The array controller 312 may initiate the parity block calculation using a series of commands that store intermediate results in an accumulator memory. The parity calculation may be performed using many different algorithms, including XOR, even or odd parity, CRC (cyclic redundancy code), ECC (Error Checking and Correcting or Error Checking Code), Reed-Solomon codes, etc. For example, in one embodiment, a parity calculation P for a 4-block stripe may equal B0 XOR B1 XOR B2 XOR B3, where B0–B3 are each blocks of data. The parity block P may be calculated using the following steps, where A represents a block operand or result that is stored in a portion of an accumulator memory:

(1) A=B0
(2) A=A XOR B1
(3) A=A XOR B2
(4) A=A XOR B3
(5) P=A

Figure 2:
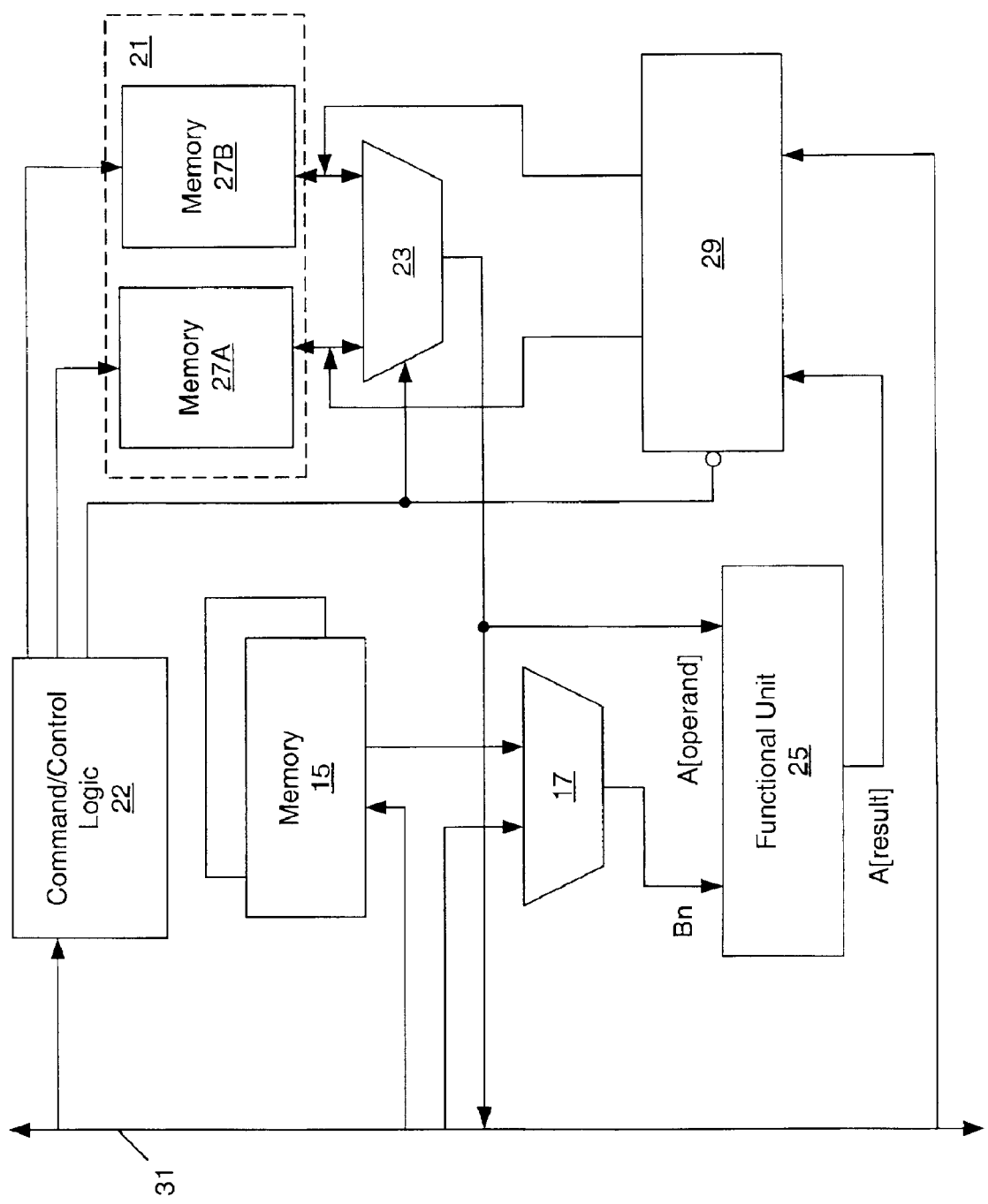
FIG. 2 illustrates one embodiment of a system for performing a block operation.

Turning to FIG. 2, one embodiment of a system for performing an operation on block operands is shown. For simplicity, the embodiment illustrated in FIG. 2 is described using the parity calculation example defined in steps 1–5 above. However, in other embodiments, the system shown in FIG. 2 may be configured to perform other and/or additional block operations.

Functional unit 25 may be configured to perform one or more different operations on one or more block operands. For example, the functional unit 25 may include dedicated hardware configured to perform a specific function (e.g., addition, subtraction, multiplication, XOR or other parity calculations, etc.). Operands may be provided to the functional unit 25 from several sources. For example, in this embodiment, multiplexer 17 may be used to select a first operand from either memory 15 or another source (e.g., a disk drive) via bus 31. Multiplexer 23 may be used to select another operand from one of the independently interfaced memory banks 27 in the accumulator memory 21.

The independent interfaces of memory banks 27 allow each memory bank 27 to receive separate control signals and have separate data buses for receiving and outputting data. Thus, memory bank 27A may receive a read command and, in response, output data on its data bus during the same memory access cycle that memory bank 27B receives a write command and, in response, stores data that is present on its data bus.

The functional unit 25 may be configured to perform an operation such as an XOR operation a byte or word at a time. For example, the functional unit may receive successive words of each operand, XOR the received words, and output successive words of the result.

The control logic 22 controls an accumulator memory 21 that includes two independently interfaced memory banks 27. Control logic 22 may include a memory controller that controls read and write access to the memory banks 27. For example, the control logic may be configured to provide signals that identify a memory location to be accessed to each of the memory banks 27. Additionally, the control logic 22 may generate signals indicative of what type of operation (e.g., read or write) should be performed on the identified memory location and that cause that operation to be performed.

Selection device 29 may be configured to provide data from either bus 31 or function unit 25 to either of the memory banks 27. Control logic 22 may assert one or more signals indicating which input selection device 29 should accept and which memory device 27 that input should be provided to.

Multiplexer 23 may select data from either one of the memory banks 27 and provide the selected data to bus 31 and/or functional unit 25. Multiplexer 23 may be controlled by control logic 22.

In this embodiment, a higher-level controller (e.g., a RAID array controller) may initiate a block XOR operation to calculate the parity P of a stripe of data B, which includes four blocks of data B0–B3, by issuing the series of commands 1–5 shown above.

Control logic 22 may be configured to receive commands identifying A (e.g., by specifying an address of the accumulator memory 21 to identify A) as an operand or a result and, in response, to cause the memory banks 27 to store or provide data as requested. For example, in response to receiving command 1, control logic 22 may generate signals that identify a location in memory bank 27A. Control logic 22 may also generate signals that instruct memory bank 27A to store data to that location. If B0 is being provided from bus 31, control logic 22 may cause selection device 29 to select the data being provided from the bus 31 and to direct that data to memory bank 27A to be written to the location in memory bank 27A.

The next time control logic 22 receives a command that identifies A as an operand, control logic 22 may cause memory bank 27A to output the data that was stored in step 1. So, in response to receiving command 2, the data is output from memory bank 27A and the control logic may generate the proper signals to cause multiplexer 23 to select memory bank 27A's output to be provided to functional unit 25. Since B1 is being provided via bus 31 or from memory 15, multiplexer 17 may be used to provide B1 to the functional unit 25. In response to receiving the two operands, A and B1, functional unit 25 may perform the XOR operation and output the result.

Since A is also identified as a result in step 2, control logic 22 may generate signals that identify a location in memory bank 27B and that tell memory bank 27B that a write is being performed. The control logic 22 may also generate signals that cause selection device 29 to provide the functional unit 25's output to memory bank 27B. Thus, control logic 22 may cause the result to be stored in memory bank 27B. This way, the result is written to a different memory bank 27B than the operand is stored in. Since the two memory banks 27 are independently interfaced, data may be read from one memory bank during the same block access cycle that data is being written to the other. Thus, control logic 22 may generate the signals that cause memory bank 27A to output data at approximately the same time as it generates the signals that cause memory bank 27B to store data being output from functional unit 25.

When control logic 22 receives the command for step 3, control logic 22 may cause memory bank 27B to output the data stored in step 2 and multiplexer 23 to provide memory bank 27B's output to the functional unit 25. Multiplexer 17 may be used to provide B2 to the functional unit 25 from either memory 15 or from a source connected to bus 31. Functional unit 25 may perform the XOR operation on the two operands and output the result. In order to store the result in a different memory bank than the operand is currently stored in, control logic 22 may generate signals that cause selection device 29 to provide the functional unit 25's output to memory bank 27A. Control logic 22 may also generate signals identifying a location in memory bank 27A and causing memory bank 27A to store the result to that location.

Similarly, when control logic 22 receives the command for step 4, it may generate signals that cause memory bank 27A to output the data stored in step 3 and multiplexer 23 to provide memory bank 27A's output to the functional unit 25. Control logic 22 may generate signals that cause selection device 29 to provide the result from functional unit 25 to memory bank 27B and that cause memory bank 27B to store the result. In step 5, the control logic 22 may generate signals that cause the final result stored in memory bank 27B to be output via multiplexer 23 to the bus 31.

As this example operation shows, control logic 22 may be configured to alternate between which memory bank stores A so that one memory bank 27 is providing the operand to the functional unit while the other memory bank 27 is storing the result. Accordingly, the control logic 22 for the two independently interfaced memory banks may essentially map the address specified in the commands to the address of a location in either memory bank 27A or 27B in order to alternate between storing the result in memory bank 27A and memory bank 27B as each step of the operation is performed. Thus, the steps of the parity calculation, as implemented by the control logic 22, may be:

(1) A[memory bank 27A]=B0
(2) A[memory bank 27B]=A[memory bank 27A] XOR B1
(3) A[memory bank 27A]=A[memory bank 27B] XOR B2
(4) A[memory bank 27B]=A[memory bank 27A] XOR B3
(5) P=A[memory bank 27B]

Accordingly, even though the commands from the higher-level controller may use a single address to identify A, control logic 22 may control the memory banks so that the result A is not stored in the same memory bank 27 as the operand A in any given step. Control logic 22 may also track which memory bank 27 contains the current value of A (from the higher-level controller's perspective). For example, the control logic 22 may map A to addresses within the memory banks 27. Control logic 22 may use these address mappings to track which memory bank 27 contains the current value of A. Because the control logic 22 controls the memories 27 this way, the higher-level controller may view accesses to these memory banks 27 as accesses to a single memory, even though two separate memory banks are actually being used. Accordingly, the system shown in FIG. 2 may be used in an existing system with very little, if any, modification of the existing higher-level controller.

Because memory banks 27 are independently interfaced, the operand A can be read from one memory bank while the result is being written to the other. Since the operation may be performed without having to read and write to the same memory bank in the same step, the accumulator memory 21 may not create a performance bottleneck so long as the memory banks 27 are each providing and storing data at the same rate as the other operand, Bn, is being provided from either memory 15 or from another source via bus 31.

Additionally, since the result of the previous step is not overwritten during each step, a single step of the operation may be restarted if an error occurs. For example, if an error occurs in step 2 as operand B1 is being transferred to the functional unit 25, step 2 may be cancelled. Since operand A is still stored, unmodified, in memory bank 27A, step 2 may then be restarted (as opposed having to start again at step 1) by control logic 22. The control logic 22 may cause memory bank 27A to provide the data to the functional unit 25 again, and the result of the restarted operation may be written to memory bank 27B.

Additionally, because independently interfaced memory banks are used in the accumulator memory, the accumulator memory may not need specialized memory components (e.g., dual-ported VRAM or double-speed memory) to keep up with the source of operand Bn. Accordingly, memory banks 27 may include standard, high-volume production memory components. For example, in the embodiment illustrated in FIG. 2, the memory used for each memory bank 27 may be the same type (e.g., DRAM) and speed of memory as memory 15.

When using the system shown in FIG. 2, one memory bank 27 may remain in read mode while the other remains in write mode for the duration of each step. If the memories banks 27 remain in one mode for the duration of each step (as opposed to having to alternate between read and write mode repeatedly for each byte or word of the block operation each step), the memory banks 27 may operate more efficiently.

In the previous example, the commands specified each operation using the same address A to identify both an operand and a result. In another embodiment, commands may initiate a similar calculation using two or more different accumulator addresses (as opposed to a single accumulator address). For example, the XOR calculation described above may be implemented using these commands, where A and C each represent an address in the accumulator memory:

(1) A=B0
(2) C=A XOR B1
(3) A=C XOR B2
(4) C=A XOR B3
(5) P=C

A system similar to the one shown in FIG. 2 may be used to perform this operation. For example, in one embodiment, the control logic 22 may be configured to receive the command for step 1 and cause selection device 29 to provide B0 to memory bank 27A in order to store B0 to a location in memory bank 27A. In step 2, control logic 22 may cause memory bank 27A to provide A to the functional unit 25 via multiplexer 23 and to store the result to memory bank 27B. Similarly, in step 3, the control logic may cause memory bank 27B to provide the data stored in step 2 to the functional unit 25. The control logic 22 may also cause memory bank 27A to store the result provided by the functional unit 25. In step 4, the result from step 3 may be provided from memory bank 27A and the result from the functional unit 25 may be written to memory bank 27B. In step 5, the result stored in step 4 may be provided from memory bank 27B to the bus 31.

Thus, like the control logic 22 in the previous example, the control logic 22 may be configured to control memory banks 27 in such a way that neither memory is both written to and read from in the same block operation step. In this example, since operands A and C may be identified by different addresses, the control logic 22 may be configured to dynamically map the addresses used to identify operands A and C to addresses in memory banks 27 each step so that A and C are consistently mapped to different banks. Thus, control logic 22 may treat the addresses provided in the commands from the system level controller as virtual addresses and use its address mappings to locate the requested data in one of memory banks 27.

Figure 3A:
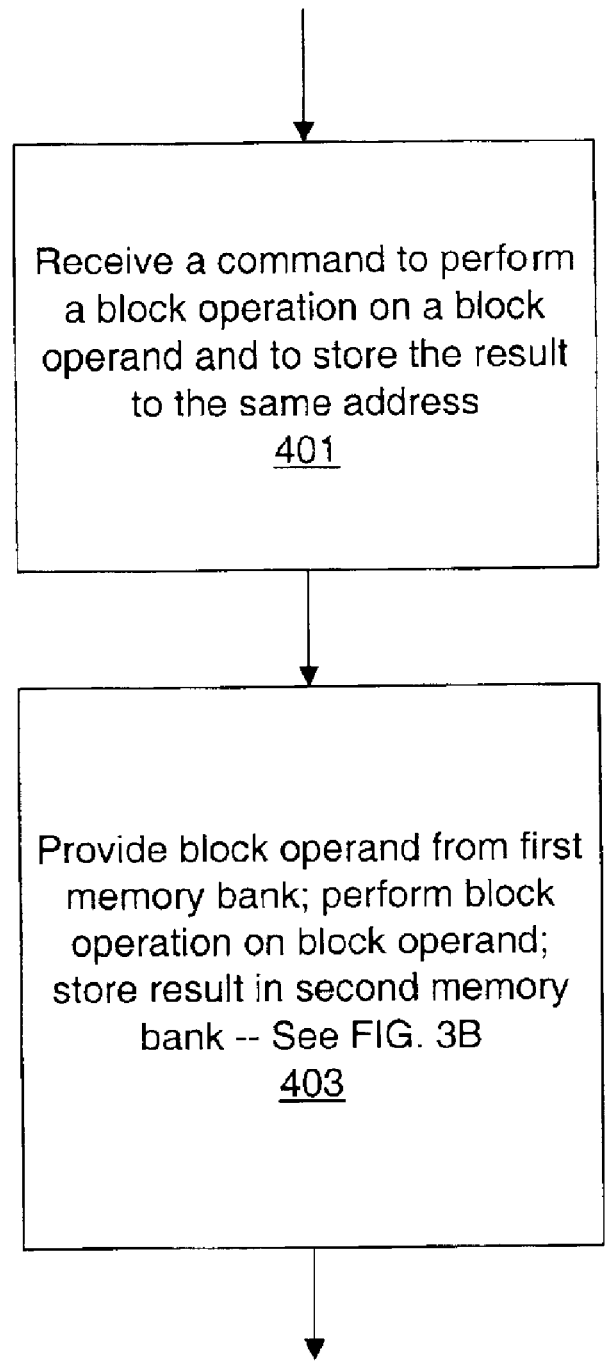
FIGS. 3A & 3B illustrate one embodiment of a method for performing a block operation.

FIG. 3A illustrates one embodiment of a method for performing a block operation. At 401, a command to perform an operation on an operand in an accumulator memory and to store the result of the operation to the address of the operand is received. For example, the command may be a command to perform a parity calculation (e.g., A=A XOR Bn) issued by a storage array controller. The first operand may be multiple bytes or words in size. The command may identify the operand and the storage location for the result using an address (e.g., A) of the accumulator memory.

In response to receiving the first command, the operand is provided from a first memory bank in the accumulator memory to a device that is configured to perform the operation (e.g., a functional unit like the one shown in FIG. 2). In some embodiments, the operation may have other operands in addition to the operand that is stored in the accumulator memory. The operation is performed and the result of the operation is stored in a second memory bank, as indicated at 403. This way the accumulator memory may not present a performance bottleneck.

Depending on the configuration of the functional unit that is performing the operation, it may not be possible to provide the entire block operand to the functional unit and/or to store the entire block result of the operation as part of a single memory transaction. Instead, each byte or word in the block operand and/or block result may be provided, operated on, and stored in a separate transaction. Thus, step 403 may represent the sub-steps 433–439 shown in FIG. 3B.

Figure 3B:
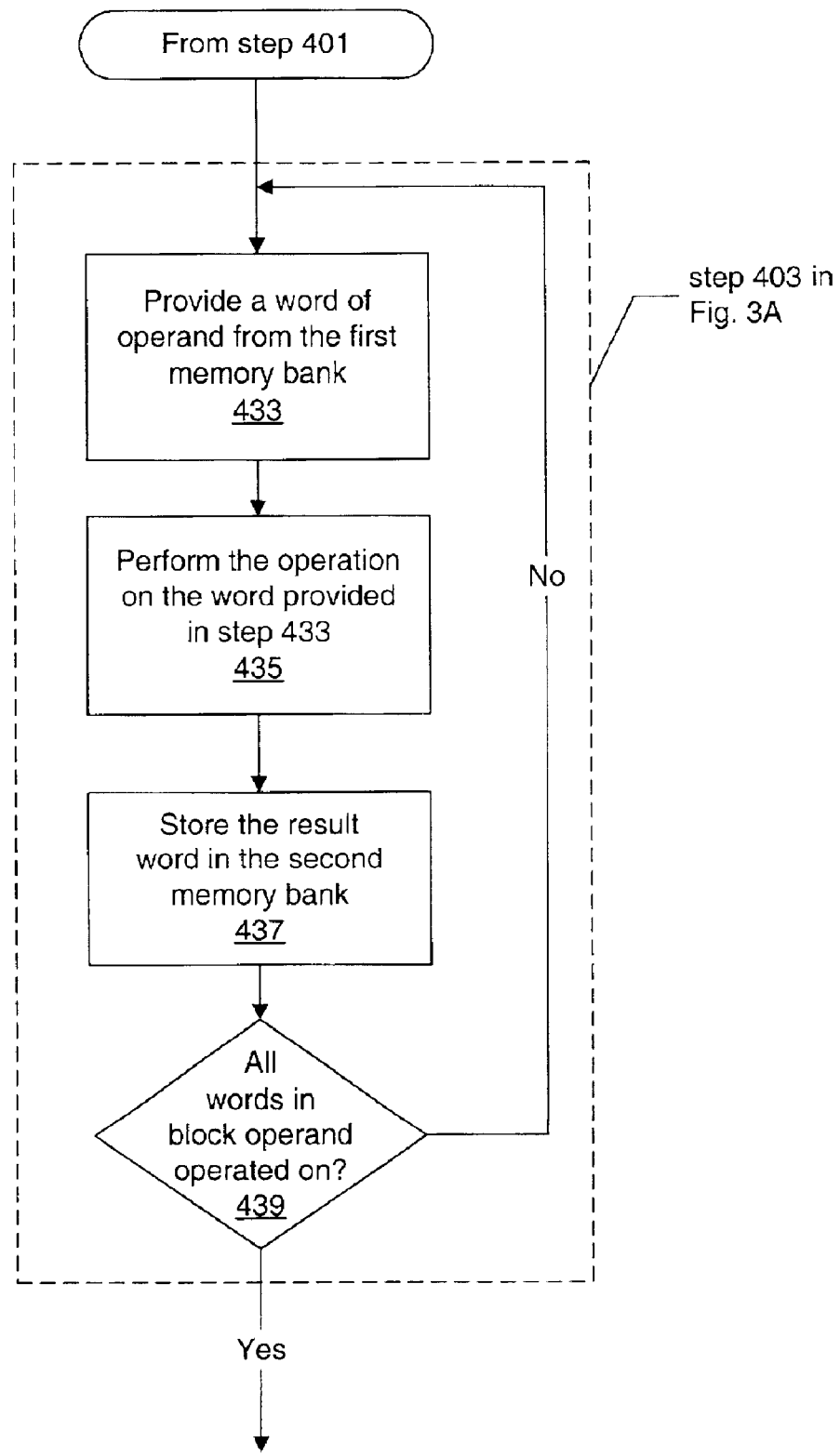

In FIG. 3B, step 403 includes multiple sub-steps. First, a byte or word of the block operand may be provided from the first memory bank to a functional unit, as shown in step 433. The operation may be performed on that byte or word, and the resulting byte or word may be stored in the second memory bank, as indicated at 435–437. These sub-steps 433–437 may be repeated for successive bytes or words of the block operand until the entire block operand has been operated on, as shown at 439.

Returning to FIG. 3A, since the first and second memory banks are independently interfaced, the result may be stored in the second memory bank at the same time the operand is being provided from the first memory bank during step 403.

If a second command is subsequently received that identifies a second operand using the same address specified in step 401, the second operand may be provided from the second memory bank, since that is where the result of the first operation was stored. For example, an address mapping that maps the address of the result to the location in the second memory bank in which the result of the first operation was stored may be created in step 403. This address mapping may be used to later provide a second operand identified by the same address. This way, the correct value of the operand may be provided in response to each received command.

Additionally, if the operand is stored in a different memory bank than the result, the operand will not be overwritten by the result. Accordingly, if an error occurs while the operation is being performed, the operation specified in a particular command may be restarted (as opposed to having to restart an entire series of commands).

Figure 4:
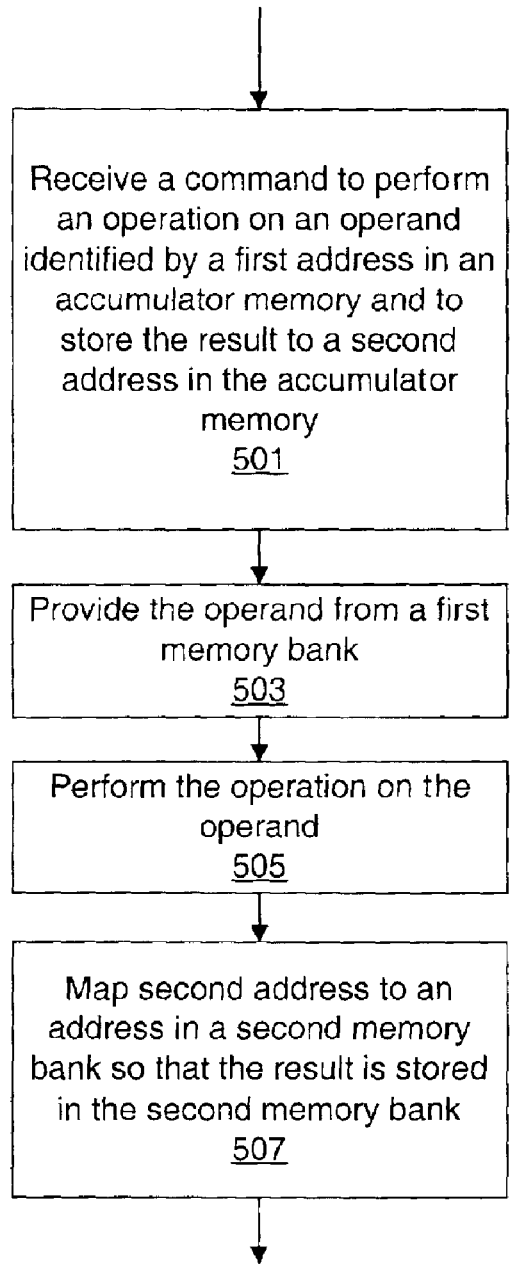
FIG. 4 shows another embodiment of a method of performing a block operation.

FIG. 4 shows another embodiment of a method for performing a block operation. In FIG. 4, the block operation is initiated in response to receiving a command to perform an operation on an operand identified by a first address in an accumulator memory, as indicated at 501. The command specifies that the result of the operation should be stored in a second address in the accumulator memory. In some embodiments, the first and second addresses may be the same. The accumulator memory includes two independently interfaced memory banks.

In response to receiving the command, the operand may be provided from whichever memory bank in the accumulator memory is currently storing the operand. For example, if the first memory bank is currently storing the operand, the operand may be provided from the first memory bank, as shown at 503, and the operation may be performed on the operand, as shown at 505. The second address may be mapped to an address in the second memory bank so that the result will be stored in a different memory bank than the operand is stored in, as indicated at 507. Note that steps 503–507 may represent multiple sub-steps such as steps 433–439 shown in FIG. 3B. If the first and second memory banks are independently interfaced, the operand may be provided from the first memory bank at the same time as the result is being written to the second memory bank.

If another command that identifies an operand using the second address is received, the address mapping that was created when the second address was mapped to an address in the second memory bank may be used to access the result stored in the second memory bank in step 507. If this command stores a result to another address in the accumulator memory, the result address may be remapped to an address in the first memory bank. Thus for each command that specifies addresses in the accumulator for both an operand and a result, the method may remap the result addresses so that the result is always stored in a different memory bank than the operand.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a functional unit configured to perform an operation on one or more block operands;
   an accumulator memory comprising a first memory bank having a first interface and a second memory bank having a second interface, wherein the first and second interfaces are independent of each other; and
   a control unit configured to receive a first command to perform the operation on a first operand identified by an address of the accumulator memory and to store a first result of the operation to the same address;

wherein in response to receiving the first command, the control unit is configured to cause the first memory bank to output the first operand to the functional unit via the first interface and to cause the second memory bank to store the first result generated by the functional unit via the second interface;

wherein the functional unit is configured to perform the operation on two operands, wherein the second operand is provided by a source other than the first and second memory banks, wherein the source of the second operand and the accumulator memory each comprise a same type and speed of single-ported memory.

2. The apparatus of claim 1, wherein in response to the functional unit completing the first operation, the control unit is configured to cause the second memory bank to provide a third operand if the control unit receives a second command that identifies the third operand using the address.

3. The apparatus of claim 1, wherein the control unit is further configured to receive a second command to perform the operation on a third operand and to store a second result of the operation to the address, wherein in response to receiving the second command, the control unit is configured to cause the second memory bank to provide the third operand to the functional unit via the second interface and to cause the first memory bank to store the second result via the first interface.

4. The apparatus of claim 3, wherein in response to the functional unit completing the second operation, the control unit is configured to cause the first memory bank to provide a fourth operand if the control unit receives a third command that identifies the fourth operand using the address.

5. The apparatus of claim 1, wherein the operation has a duration extending from when the operation is initiated to when the operation completes, and wherein for the duration of the operation that is performed on the first operand, the first memory bank is in a providing mode and the second memory bank is in a storing mode.

6. The apparatus of claim 1, wherein the operation comprises a parity calculation, and wherein the command is issued by a storage system controller.

7. The apparatus of claim 1, wherein the control unit is configured to restart the operation in response to an error occurring by providing the first operand from the first memory bank again and by storing the result of the restarted operation in the second memory bank.

8. An apparatus, comprising:
a functional unit configured to perform an operation on one or more block operands;
an accumulator memory comprising a first memory bank having a first interface and a second memory bank having a second interface, wherein the first and second interfaces are independent of each other; and
a control unit configured to receive a first command to perform the operation on a first operand identified by an address of the accumulator memory and to store a first result of the operation to the same address;
wherein in response to receiving the first command, the control unit is configured to cause the first memory bank to output the first operand to the functional unit via the first interface and to cause the second memory bank to store the first result generated by the functional unit via the second interface;
wherein the control unit is configured to restart the operation in response to an error occurring by providing the first operand from the first memory bank again and by storing the result of the restarted operation in the second memory bank, wherein the error comprises a functional unit error that occurs while performing the operation.

9. An apparatus, comprising:
a functional unit configured to perform an operation on one or more block operands;
an accumulator memory comprising a first memory bank having a first interface and a second memory bank having a second interface, wherein the first and second interfaces are independent of each other; and
a control unit configured to receive a first command to perform the operation on a first operand identified by an address of the accumulator memory and to store a first result of the operation to the same address;
wherein in response to receiving the first command, the control unit is configured to cause the first memory bank to output the first operand to the functional unit via the first interface and to cause the second memory bank to store the first result generated by the functional unit via the second interface;
wherein the control unit is configured to restart the operation in response to an error occurring by providing the first operand from the first memory bank again and by storing the result of the restarted operation in the second memory bank, wherein the functional unit is configured to perform the operation on two operands, and wherein the error comprises a transmission error that occurs while a second operand is being provided from a source other than the first and second memory banks.

10. An apparatus, comprising:
a functional unit configured to perform an operation on one or more block operands;
an accumulator memory comprising a first memory bank having a first interface and a second memory bank having a second interface, wherein the first and second interfaces are independent of each other; and
a control unit configured to receive commands to perform the operation, wherein each command to perform the operation instructs the control unit to perform the operation on an operand identified by a first address in the accumulator memory and to store a result of the operation to a second address in the accumulator memory;
wherein in response to every command to perform the operation that the control unit receives, the control unit is configured to provide the operand from one of the first and second memory banks to the functional unit and to map the second address to a location in the other one of the first and second memory banks so that the result of the operation is always stored in a different memory bank than the operand is stored;
wherein the functional unit is configured to perform the operation on two operands, wherein one of the operands is provided by either the first or the second memory bank and the other operand is provided by a source other than the first and second memory banks, wherein the source and the accumulator memory each comprise a same type and speed of single-ported memory.

11. The apparatus of claim 10, wherein the first and second addresses are the same.

12. The apparatus of claim 10, wherein the operation comprises a parity calculation, and wherein the command is issued by a storage system controller.

13. The apparatus of claim 10, wherein during the performance of the operation initiated by receiving one of the commands, the control unit is configured to restart the operation in response to an error occurring by providing the operand from the one of the first and second memory banks again.

14. The apparatus of claim 13, wherein the operation has a duration extending from when the operation is initiated to when the operation completes, and wherein for the duration of the operation that is performed on a first operand, the first memory bank is in a providing mode and the second memory bank is in a storing mode.

15. An apparatus, comprising:
a functional unit configured to perform an operation on one or more block operands;
an accumulator memory comprising a first memory bank having a first interface and a second memory bank having a second interface, wherein the first and second interfaces are independent of each other; and
a control unit configured to receive commands to perform the operation, wherein each command to perform the operation instructs the control unit to perform the operation on an operand identified by a first address in the accumulator memory and to store a result of the operation to a second address in the accumulator memory;
wherein in response to every command to perform the operation that the control unit receives, the control unit is configured to provide the operand from one of the first and second memory banks to the functional unit and to map the second address to a location in the other one of the first and second memory banks so that the result of the operation is always stored in a different memory bank than the operand is stored;
wherein during the performance of the operation initiated by receiving one of the commands, the control unit is configured to restart the operation in response to an error occurring by providing the operand from the one of the first and second memory banks again, wherein the error comprises a functional unit error that occurs while performing the operation.

16. An apparatus, comprising:
a functional unit configured to perform an operation on one or more block operands;
an accumulator memory comprising a first memory bank having a first interface and a second memory bank having a second interface, wherein the first and second interfaces are independent of each other; and
a control unit configured to receive commands to perform the operation, wherein each command to perform the operation instructs the control unit to perform the operation on an operand identified by a first address in the accumulator memory and to store a result of the operation to a second address in the accumulator memory;
wherein in response to every command to perform the operation that the control unit receives, the control unit is configured to provide the operand from one of the first and second memory banks to the functional unit and to map the second address to a location in the other one of the first and second memory banks so that the result of the operation is always stored in a different memory bank than the operand is stored;
wherein during the performance of the operation initiated by receiving one of the commands, the control unit is configured to restart the operation in response to an error occurring by providing the operand from the one of the first and second memory banks again, wherein the functional unit is configured to perform the operation on two operands, wherein one of the operands is provided by either the first or the second memory bank and the other operand is provided by a source other than the first and second memory banks, and wherein the error comprises a transmission error that occurs while the second operand is being provided from the source.

17. A method of performing a block operation, the method comprising:
receiving a first command to perform an operation on a first operand identified by a first address and to store a first result of the operation to the first address; and
in response to said receiving a first command:
providing the first operand from a first memory bank in an accumulator memory via a first interface;
performing the operation on the first operand; and
storing the first result of the operation in a second memory bank in the accumulator memory via a second interface, wherein the first and second interface are independent of each other;
wherein said performing the operation on the first operand comprises performing the operation on both the first operand and another operand, wherein the other operand is provided by a source other than the first and second memory banks, wherein the accumulator memory and the source each comprise a same type and speed of single-ported memory.

18. The method of claim 17, further comprising causing the second memory bank to provide a second operand in response to receiving another command that identifies the second operand using the first address after said storing the first result of the operation in the second memory bank.

19. The method of claim 17, further comprising:
receiving a second command to perform the operation on a second operand identified by the first address and to store a second result of the operation to the first address; and
in response to said receiving a second command:
providing the second operand from the second memory bank via the second interface;
performing the operation on the second operand; and
storing the second result in the first memory bank via the first interface.

20. The method of claim 19, further comprising causing the first memory bank to provide a third operand in response to receiving another command that identifies the third operand using the first address after said storing the second result of the operation in the first memory bank.

21. The method of claim 17, wherein the operation has a duration extending from when the operation is initiated to when the operation completes, and wherein for the duration of the operation that is performed on the first operand, the first memory bank is in a providing mode and the second memory bank is in a storing mode.

22. The method of claim 17, wherein the operation comprises a parity calculation, and wherein the first command is issued by a storage system controller.

23. The method of claim 17, further comprising restarting said performing the operation on the first operand in response to an error occurring, wherein said restarting comprises providing the first operand from the first memory bank again and storing the result of the restarted operation in the second memory bank.

24. A method of performing a block operation, the method comprising:
receiving a first command to perform an operation on a first operand identified by a first address and to store a first result of the operation to the first address; and
in response to said receiving a first command:
providing the first operand from a first memory bank in an accumulator memory via a first interface;
performing the operation on the first operand;

restarting said performing the operation on the first operand in response to an error occurring, wherein said restarting comprises providing the first operand from the first memory bank again and storing the result of the restarted operation in the second memory bank, wherein the error comprises an error that occurs while performing the operation; and storing the first result of the operation in a second memory bank in the accumulator memory via a second interface, wherein the first and second interface are independent of each other.

25. A method of performing a block operation, the method comprising:

receiving a first command to perform an operation on a first operand identified by a first address and to store a first result of the operation to the first address; and in response to said receiving a first command:
providing the first operand from a first memory bank in an accumulator memory via a first interface;
performing the operation on the first operand;
restarting said performing the operation on the first operand in response to an error occurring, wherein said restarting comprises providing the first operand from the first memory bank again and storing the result of the restarted operation in the second memory bank, wherein the error comprises a transmission error that occurs while another operand is being provided by a source other than the first and second memory banks; and
storing the first result of the operation in a second memory bank in the accumulator memory via a second interface, wherein the first and second interface are independent of each other.

26. A method of performing a block operation, the method comprising:

receiving one or more commands to perform an operation on an operand identified by a first address in an accumulator memory and to store a result of the operation to a second address in the accumulator memory, wherein the accumulator memory comprises two independently interfaced memory banks; and in response to receiving each of the one or more commands:
providing the operand from one of memory banks in the accumulator memory;
performing the operation on the operand, wherein said performing the operation on the operand comprises performing the operation on a first operand provided by the accumulator memory and another operand provided by a source other than the accumulator memory, wherein the accumulator memory and the source each comprise a same type and speed of single-ported memory; and
mapping the second address to a new address in the other one of the memory banks in the accumulator memory so that the result of the operation is always stored in a different memory bank than the operand is stored in.

27. The method of claim 26, wherein the first and second addresses are the same.

28. The method of claim 26, wherein the operation comprises a parity calculation, and wherein the command is issued by a storage system controller.

29. The method of claim 26, further comprising restarting said performing the operation on a first operand in response to an error occurring, wherein said restarting comprises providing the first operand from a first memory bank again and storing the result of the restarted operation in a second memory bank.

30. A method of performing a block operation, the method comprising:

receiving one or more commands to perform an operation on an operand identified by a first address in an accumulator memory and to store a result of the operation to a second address in the accumulator memory, wherein the accumulator memory comprises two independently interfaced memory banks; and in response to receiving each of the one or more commands:
providing the operand from one of memory banks in the accumulator memory;
performing the operation on the operand; and
mapping the second address to a new address in the other one of the memory banks in the accumulator memory so that the result of the operation is always stored in a different memory bank than the operand is stored in; and restarting said performing the operation on a first operand in response to an error occurring, wherein said restarting comprises providing the first operand from a first memory bank again and storing the result of the restarted operation in a second memory bank, wherein the error comprises a transmission error that occurs while another operand for the operation is being provided from a source other than the accumulator memory.

31. A method of performing a block operation, the method comprising:

receiving one or more commands to perform an operation on an operand identified by a first address in an accumulator memory and to store a result of the operation to a second address in the accumulator memory, wherein the accumulator memory comprises two independently interfaced memory banks; and in response to receiving each of the one or more commands:
providing the operand from one of memory banks in the accumulator memory;
performing the operation on the operand; and
mapping the second address to a new address in the other one of the memory banks in the accumulator memory so that the result of the operation is always stored in a different memory bank than the operand is stored in; and restarting said performing the operation on a first operand in response to an error occurring, wherein said restarting comprises providing the first operand from a first memory bank again and storing the result of the restarted operation in a second memory bank, wherein the error comprises a functional unit error that occurs while performing the operation.

* * * * *